US006740410B2

(12) United States Patent
Fahey et al.

(10) Patent No.: US 6,740,410 B2
(45) Date of Patent: May 25, 2004

(54) ELECTROSTATIC DISSIPATING POLYMERIC MULTI-LAYER ARTICLE OR LAMINATE

(75) Inventors: Timothy Edward Fahey, Akron, OH (US); James Minor Ludlow, III, Sagamore Hills, OH (US); Kyung J. Kim, Broadview Heights, OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 202 days.

(21) Appl. No.: 10/126,794

(22) Filed: Apr. 19, 2002

(65) Prior Publication Data

US 2003/0003302 A1 Jan. 2, 2003

Related U.S. Application Data

(60) Provisional application No. 60/291,267, filed on May 16, 2001.

(51) Int. Cl.⁷ .............................................. B32B 27/36
(52) U.S. Cl. ...................... 428/411.1; 428/212; 428/213
(58) Field of Search .............................. 428/411.1, 212, 428/213

(56) References Cited

U.S. PATENT DOCUMENTS

| | | | |
|---|---|---|---|
| 2,623,031 A | 12/1952 | Snyder | |
| 3,425,981 A | 2/1969 | Puletti et al. | |
| 3,651,014 A | 3/1972 | Witsiepe | |
| 3,763,109 A | 10/1973 | Witsiepe | |
| 3,896,078 A | 7/1975 | Hoaschele | |
| 4,332,929 A | 6/1982 | Holub et al. | |
| 4,478,903 A | 10/1984 | Kishida et al. | |
| 5,010,139 A | 4/1991 | Yu | |
| 5,110,669 A | 5/1992 | Knobel et al. | 428/215 |
| 5,159,053 A | 10/1992 | Kolycheck et al. | |
| 5,342,889 A | 8/1994 | Sullivan et al. | |
| 5,354,950 A | 10/1994 | Golane | 174/35 MS |
| 5,574,104 A | 11/1996 | Kolycheck et al. | |
| 5,863,466 A | 1/1999 | Mor | |
| 5,914,191 A | 6/1999 | Hanson et al. | |
| 6,140,405 A | 10/2000 | Eckstein et al. | |
| 6,268,030 B1 | 7/2001 | Zhang et al. | |

FOREIGN PATENT DOCUMENTS

WO    WO 9315624    8/1993

OTHER PUBLICATIONS

Encyclopedia of Polymer Science and Engineering, vol. 12, John Wiley & Sons, Inc., NY, N.Y., 1988, pp. 49–52.

*Primary Examiner*—Terressa Boykin
(74) *Attorney, Agent, or Firm*—Joe A. Powell; Thoburn T. Dunlap; Hudak, Shunk, Farine & Co., LPA

(57) ABSTRACT

The present invention relates to a thermoplastic, multi-layer, electrostatic discharging, laminate comprised of at least one outer layer that is permanent static dissipative and non-contaminating, and a core or base layer that is conductive. The outer layer has a surface resistivity of from about $1.0 \times 10^5$ to about $1.0 \times 10^{12}$ Ohm/sq, and the core layer has a surface resistivity of from about $1.0 \times 10^1$ to about $1.0 \times 10^{11}$ Ohm/sq.

32 Claims, No Drawings

ELECTROSTATIC DISSIPATING POLYMERIC MULTI-LAYER ARTICLE OR LAMINATE

This application claims the benefit of provisional application No. 60/291,267 filed May 16, 2001

FIELD OF THE INVENTION

The present invention relates to a thermoformable polymeric multi-layer article or laminate for dissipating electrostatic charges and comprises an electrostatic dissipating or discharging core layer and at least one overlayer. The overlayer is substantially free of particulation, and sloughing. Preferably, the core layer has better dissipative properties than the overlayer in order to drain electrostatic charges away from the surface of the laminate.

BACKGROUND

Most thermoplastics are electrical insulators. The accumulation and retention of static electrical charges on the surface of most plastics due to their low conductivity is well known. The accumulation of static charge on the surface of a plastic is undesirable for various reasons. Sometimes the static charge on these materials can discharge very quickly and damage sensitive components or articles which come in contact with the plastic. In addition, dust is typically attracted to and accumulates on materials carrying a static charge. Therefore, the electrostatic dissipative properties of plastic materials are of importance in various applications where static charge accumulation must be avoided.

Four major approaches have been used to alleviate the accumulation of static electrical charges in plastics: external chemical treatments, internal chemical additives, conductive fillers and polymeric additives. Each approach while effective in certain specific applications, suffers from deficiencies.

The external chemical treatments, hygroscopic surfactants that can be applied to the surface of the plastic article, suffer due to their reliance on high humidity for effectiveness. Generally, the relative humidity needs to be greater than 30%. Also, permanence is an issue since the external chemical treatment can be rubbed, wiped or washed off resulting in a loss of electrostatic discharge ("ESD") protection. These types of chemical treatments are particularly undesirable in sensitive electronic handling applications where contamination of the components is an issue. Examples of these chemical treatments include fatty acids and their amines or salts, quaternary ammonium salts, monoalkyl glycerides, alkyl phosphonates and sulfonamides.

Internal chemical additives rely upon additive migration to the surface of the plastics to provide ESD protection to the plastic. Internal chemical additives are generally low molecular weight non-polymeric, hygroscopic surfactants which are compounded into the plastic material itself. While this approach provides more permanence than the external chemical treatments, just like external chemical treatments it is also prone to be rubbed, wiped or washed away. Internal chemical additives migrate to the surface of the plastic because of their limited compatibility with the plastic. When the additive migrates to the surface, it can be wiped, abraded or washed off, leaving the surface without any ESD protection. A static charge can then build on the surface, since the material is not protected. This lack of permanence results in periods of ESD susceptibility in which the plastic cannot dissipate a charge until additional additives can bloom to the surface. In addition, the ESD additive can contaminate sensitive devices that come into contact with the plastic article. The internal chemical additives also depend upon high humidity to be effective.

The use of conductive fillers can also alter the electrical properties of plastics. Examples of conductive fillers include conductive carbon black, carbon fibers, metal-coated substrates, metallic fibers or fillers. Although the conductive fillers are neither humidity dependent or susceptible to being wiped, washed or rubbed away, they do have certain disadvantages. For example, conductive fillers tend to increase the melt viscosity for processing the blend. Also, conductive fillers tend to limit the colorability of the plastic materials. Generally, they also tend to decrease the physical properties of the blend such as impact resistance. Also, contamination concerns often preclude the use of plastics loaded with conductive fillers in environments such as cleanrooms.

Conductive fillers also tend to have steep loading curves. As the percentage of conductive filler in the insulative thermoplastic is increased from zero, the composite material's bulk will remain insulative until a continuous network of the conductive filler is formed. At this point, often called percolation, the resistivity will drop sharply with increasing filler percentage. The steep slope of the loading curve once the network is formed demonstrates the high level of variability that can be inherent in the electrical properties in these heterogeneous materials, particularly after secondary processes such as thermoforming. On a microscopic scale, different domains or regions within the composite will have varying concentrations of filler and hence varying levels of resistivity. Regions with low levels of filler can be electrically insulative and retain voltages that can potentially damage sensitive microelectronic devices. Such regions or domains are commonly called "hot spots." Conductive regions within the material can discharge voltages too rapidly, releasing current densities that can damage devices. This deficiency is more of a concern as microelectronic devices become more and more sensitive.

Numerous examples of internal polymeric additives exist. An example of the addition of an electrostatic dissipative polymer being added to an insulative polymer can be found in U.S. Pat. No. 3,425,981 to Puletti. The patent to Puletti discloses an olefin polymer composition containing ethylene oxide based polymers and exhibiting enhanced antistatic properties. Additionally, U.S. Pat. No. 5,010,139 to Yu discloses an antistatic polymeric composition consisting of a blend of a polymeric material and antistatic additive which is an ethylene oxide based copolymer or terpolymer material. The polymeric material can be any thermoplastic, thermoplastic elastomer or elastomer including acrylonitrile butadiene styrene (ABS); copolymers of styrene and acrylonitrile modified with acrylic elastomers (ASA); polyamides; polybutylene terephthalate (PBT); polyethylene terephthalate (PET); polyethylene terephthalate glycol (PETG); polymethylmethacrylate (PMMA); polyurethane (TPU); polyvinyl chloride (PVC); chlorinated polyvinyl chloride (CPVC); polycarbonate (PC); polyoxymethylene (POM); polyphenylene oxide (PPO); copolymer of styrene and maleic anhydride SMA; and styrene acrylonitrile copolymer (SAN).

U.S. Pat. No. 5,159,053 discloses a thermoplastic polyurethane which has electrostatic dissipative properties. The thermoplastic polyurethane comprises the reaction product of an ethylene ether oligomer glycol reacted with a non-hindered diisocyanate and an extender glycol. The ethylene ether oligomer intermediate comprises a polyethylene glycol, having an average molecular weight from about 500 to about 5,000. Such materials are commonly called inherently dissipative polymer (IDP).

U.S. Pat. No. 6,140,405 discloses the modification of the aforementioned electrostatic dissipative thermoplastic polyurethane with salts, enhancing the rate of static dissipation in the neat form and when blended with a variety of base polymers.

U.S. Pat. No. 5,342,889 discloses electrostatic dissipative polymeric compositions which are blends of an effective amount of a chain extended polymer and a matrix polymer. The chain extended polymer is formed from low molecular weight polyethers which are reacted with a chain extender and a diisocyanate. The matrix polymers include PVC, CPVC, a terpolymer of styrene, acrylonitrile and diene rubber; a copolymer of styrene and acrylonitrile modified with acrylate elastomers; a copolymer of styrene and acrylonitrile modified with ethylene propylene diene monomer rubber; rubber modified impact polystyrene; thermoplastic polyesters including PBT, PET and polyether-ester block copolymer; polyphenylene oxide; polyacetal; polymethyl methacrylate or mixtures thereof.

The usage of polymeric additives to alleviate the accumulation of static electrical charges in plastics provides a balance of performance advantages not achieved by the other ESD approaches described above. The polymeric additives are generally permanent, non-contaminating, colorable, easy to process, uniform in properties and even recyclable. These blends are commonly referred to as IDP alloys.

U.S. Pat. No. 4,478,903 to Denki describes a composite plastic sheet having a conductive surface layer. The conductive layer(s) is a carbon black filled polystyrene or ABS. The core layer material is an unfilled polystyrene or ABS. Disadvantages of such structures include high volume resistivity due to the insulative core, a carbon sloughing surface, and a surface resistivity in the conductive range.

U.S. Pat. No. 5,914,191 discloses a multi-layer structure using an IDP alloy as the outer layer to provide electrostatic dissipative characteristics. However, the core compositions described in this patent are electrical insulators. This creates a structure with deficiencies in the electrical properties such as high volume resistivity that can retard the decay of electrical charges to ground. The high volume resistivity and the requisite, higher degree of charge transfer on the surface is problematic for applications such as the packaging of today's complex and sensitive microelectronic devices.

SUMMARY OF INVENTION

The present invention comprises multi-layer structures containing a conductive, thermoplastic core and at least one static dissipative, thermoplastic outer layer. This invention creates a synergistic merger between inherently dissipative polymers and conductive filler technology through the use of multi-layer laminates.

The thermoformable multi-layer article or laminate contains a core layer comprising a conductive component, such as conductive carbon black, and a polymer having desirable properties such as stiffness, flexibility as well as strength for a desired end use application. An overlayer is preferably affixed or bonded to each core side and is generally a blend of an inherently electrostatic dissipating or dissipative polymer and a large amount of a host polymer which desirably is the same as the core polymer. The article or laminate provides an electrostatic dissipating article lacking the disadvantages of the prior art articles. When the core layer exhibits greater dissipative capacity than the overlayer, electrostatic charges accumulated can be drained or pulled away from the laminate surface to ground through the core layer. The laminate is essentially free of sloughing, particulation, and hot spots, further exhibiting low tribocharge and residual voltage.

DETAILED DESCRIPTION OF THE INVENTION

The present invention relates to a thermoformable article or laminate containing a plurality of layers or sheets, generally including at least one core layer. Preferably an overlayer is bonded on each side of the core. Less preferably, two or more overlayer sheets or layers can independently be present on each side of the core layer. Additionally, tie layers can be utilized between the core and one or more of the overlayers depending on the desired end use application.

The core layer of the present invention laminate or article has conductive properties and contains a conductive component in an amount sufficient to impart to the core layer, measured independent of any other layer, a surface resistivity of generally from about $1.0 \times 10^1$ to about $1.0 \times 10^{11}$ Ohm/sq, desirably from about $1.0 \times 10^2$ to about $1.0 \times 10^8$ Ohm/sq, preferably from about $1.0 \times 10^2$ to about $1.0 \times 10^6$ Ohm/sq, and a volume resistivity generally of from about $1.0 \times 10^1$ to about $1.0 \times 10^{11}$ Ohm-cm, desirably from about $1.0 \times 10^2$ to about $1.0 \times 10^8$, and preferably from about $1.0 \times 10^2$ to about $1.0 \times 10^6$ Ohm-cm as measured by ASTM D-257 or ESD S11.11-93. The core layer also contains at least one core polymer (which generally has negligible or no electrostatic dissipating properties) having suitable flexible and stiffness properties as well as strength for an intended end use such as in the electronic industry for packaging, process tubes, tote bins, and the like. Such properties can generally vary greatly with a desirable flexible modulus being from about 150,000 psi to about 350,000 psi.

Examples of suitable core polymers include but are not limited to amorphous polyesters, polyamide, polycarbonate, polystyrene, high impact polystyrene, styrene-acrylonitrile copolymer, acrylonitrile-butadiene-styrene copolymer, polyolefins such as polyethylene and polypropylene, polyacetal, polysulfone, polybutylene terephthalate, polyethylene terephthalate, polyethylene terephthalate glycol (PETG) which is an ester of terephthalic acid, ethylene glycol and cyclohexanedimethanol (CHDM), polyurethane, polyphenylene sulfide, polyethersulfone, polyphenylene ether, polymethylmethacrylate, polyetheretherketone, polyvinyl chloride and blends thereof. High impact polystyrene, polyethylene terephthalate glycol and polyvinyl chloride are preferred.

The core layer also includes a conductive component or material. The conductive component can be a single compound or combination of compounds which provide the core layer with dissipative or conductive properties. Suitable conductive components include, but are not limited to, carbon black, carbon fibers, carbon fibrils, metal shavings or powders, metal fillers, inherently conductive polymers (ICPS) and metal coated mineral substrates.

Inherently conductive polymer (ICP), often called "synthetic metals" or "organic metals" exhibit conductivity that falls within the range of metals. The mechanism of conductivity is electronic, as in metals. Their most common feature is the presence of conjugated double bonds. Examples of such polymers include, but are not limited to, polyaniline (PAni), polypyrrole (Ppy), polythiophene (PTh), polyacetylene (PAc), polyisothianaphthane (PITN), polyheteroarylene vinylene (ParV) in which the heteroarylene group can be thiophene, furan or pyrrole, poly-p-phenylene (PpP), polyphenylene sulfide (PPS), polyphthalocyanine (PPhC), and their derivatives, their copolymers and their physical mixtures.

The type of carbon black is generally not important so long as it adds conductive or electrostatic dissipating properties to the core polymer. According to ASTM D-1765, carbon black particles having a nitrogen adsorption value of from about 20 to about 150 square meters per gram and a DBP absorption of from about 50 to 160 cc per 100 grams can be utilized with generally smaller sized particles, i.e. higher values, being desired. Examples of common types of carbon black which can be utilized include XC-72R, N110, N220, N234, N326, N330, N339, N351, N550, N650, N660, N754, N762, and N774.

The amounts of the conductive component or material such as ICP in the core layer are dependent on factors such as type, shape, and particle size, etc. Accordingly, suitable amounts effective to impart a predetermined surface resistivity or volume resistivity to the core layer as defined above are utilized.

For example, when the conductive component is a conductive grade of carbon black, it is utilized in amounts generally from about 2 to about 30, and preferably from about 12 to about 20 parts by weight based on 100 parts by weight of core polymer present in the core layer. When the conductive material utilized is fibrils, the amount thereof is from about 0.1 to about 10 parts by weight per 100 parts by weight of core polymer present in the core layer. When the conductive material or component is a metal shaving, a metal powder, a metal filler, or metal coated mineral substrate, the amount thereof is generally from about 5 to about 70 parts by weight per 100 parts by weight of core polymer. The amount of conductive polymer, when used, is from about 5 to about 50 parts per 100 parts by weight of the core polymer.

An overlayer is melt bonded, adhered, or otherwise affixed to the core layer of the present invention, preferably through a coextrusion or lamination process. Desirably two overlayers are utilized so that the core layer is sandwiched therebetween.

The one or more overlayers comprises a blend of a) an electrostatic dissipating agent which is at least one inherently dissipative polymer and/or static dissipative additive with b) an overlayer polymer which is a host polymer, i.e., desirably is the same polymer as utilized in the core layer to ensure sufficient adhesion between the layers.

The inherently dissipative polymer (IDP) is preferably a polyethylene glycol-based polyurethane copolymer, a polyethylene glycol-based polyamide copolymer, polyethylene glycol methacrylate copolymer, poly(ethylene/propylene oxide) copolymer, polyethylene glycol based polyesteramide, polyethylene glycol based polyester elastomer, poly(epichlorohydrin/ethylene oxide) copolymer or polyesteramide derived from an ethylene oxide adduct of bisphenol with polyamid having a carboxyl group at both terminal ends, or a combination thereof.

Examples of inherently dissipative polymer (IDP) are: polyurethanes, available as Stat-Rite C-2300 and C-2400 from Noveon; polyether amides, under commercial name Pebax MV 1074 and Pebax 4011 MA from Elf Atochem, or Irgastat from Ciba; polyetheresters such as Hytrel 8099 or Hytrel 8206 from DuPont; polyetherester amides, described in U.S. Pat. No. 5,863,466 and U.S. Pat. No. 6,268,030; poly(epichlorohydrin) such as Hydrin 200 from Nippon Zeon.

The polyurethane based inherently dissipative polymer is generally derived from a hydroxyl-terminated polyether intermediate and which is also chain extended with a glycol. The polyether intermediate can be a homopolymer or a copolymer of two or more copolymerizable cyclic ether monomers. Such polyurethanes are known to the art and to the literature such as those set forth in U.S. Pat. Nos. 5,159,053; 5,342,889; 5,574,104, and 6,140,405 which are hereby fully incorporated by reference. Some of these polymers are generally available as Stat-Rite® C-2300 and Stat-Rite C-2400 from Noveon, Inc. of Cleveland, Ohio.

More specifically, as set forth in U.S. Pat. Nos. 5,342,889 and 5,574,104, the chain extended polymer having electrostatic dissipative properties comprises (A) a low molecular weight polyether oligomer having two reactive moieties and an average molecular weight from about 200 to about 10,000 wherein the oligomer is a homopolymer or a copolymer of two or more copolymerizable cyclic ether monomers having the formula:

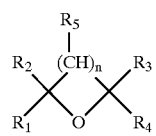

wherein $R_1$, $R_2$, $R_3$, $R_4$, and $R_5$ are independently hydrogen, unsubstituted or substituted alkyl, cycloalkyl, cycloalkenyl, aryl, aralkyl or alkaryl, and wherein the substituents which can be substituted within the foregoing are $OR_6$, $SR_6$, CN or halogens, $R_6$ is hydrogen, alkyl, cycloalkyl, cycloalkenyl, aryl, aralkyl, alkaryl, or carboxyl, and further wherein the reactive moieties are OH, $NH_2$, or $NHR_6$, and n is 0, 1, 2, or 4; (B) from about 0 moles to about 35 moles of a diol or triol for each mole of low molecular weight polyether and (C) a diisocyanate or diisocyanate type component; with the proviso that the number of moles of diisocyanate per mole of the sum of the number of moles of low molecular weight polyether oligomer plus the number of moles of diol or triol is from about 0.95 to about 1.06. The number of moles of diisocyanate per mole of the sum of the number of moles of low molecular weight polyether oligomer plus the number of moles of diol or triol is from about 0.97 to about 1.03. By low molecular weight oligomer, it is meant that the polyether will have an average molecular weight from about 200 to about 10,000 and preferably from about 500 to about 5000, as determined by end group analysis. The reaction of the low molecular weight oligomer with a diisocyanate will furnish a polymer having melt indices from 0.05 to 110 grams per ten minutes. The preferred melt index range of the polymer will be from about 1.0 to 65 grams/10 minutes. In general, the melt index is determined according to ASTM D-1238 Procedure A at a barrel temperature of 190° C. and an 8700 gram piston load.

The low molecular weight oligomer employed is a polymer of cyclic ether monomers having the formula:

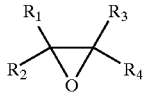

Alternatively, the low molecular weight oligomer employed is a polymer of cyclic ether monomers wherein $R_1$, $R_2$ and $R_3$ are hydrogen and $R_4$ is H, $CH_3$, or $CH_2 X$ wherein X is a halogen, $OR_6$, $NR_6 R_7$ or $COOR_6$, and $R_6$ and $R_7$ are as defined hereinabove.

The most preferred cyclic ether is ethylene oxide.

In an alternative embodiment the low molecular weight polyether oligomer is end capped with ethylene oxide or ethylene imine thereby providing an oligomer which will have two primary moieties. The alkyl groups can have from 1 to 6 carbon atoms, be straight or branched chain and may be unsubstituted or substituted. The alkenyl groups can have from 1 to 6 carbon atoms, be straight or branched chain, have 1 or two double bonds and be unsubstituted or substituted.

The cycloalkyl and cycloalkenyl groups can have from 3 to 8 ring carbon atoms and from 1 to 3 rings. The cycloalkenyl groups can have 1 or 2 double bonds.

The aryl groups can have from 6 to 10 ring carbon atoms and one or two rings.

Useful polyether oligomers are linear polymers having the general formula:

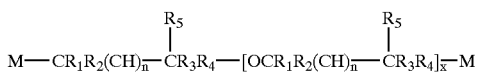

wherein X+1 is the number of repeating ether units, each M is a reactive moiety, n is 0, 1, 2, or 4 and $R_1$, $R_2$, $R_3$, $R_4$ and $R_5$ are as defined hereinabove. The most common M is the OH group. For the subject invention X+1 is at least 4 and between 4 and about 250. On a molecular weight basis, the useful range of polyether oligomers have an average molecular weight from about 200 to 10,000 and preferably from about 500 to 5000. A highly preferred oligomer is polyethylene glycol. Commercially available polyethylene glycols useful in this invention are typically designated as polyethylene glycol 600, polyethylene glycol 1450, and polyethylene glycol 4000.

The polyether oligomer can be a homopolymer or a copolymer of two or more copolymerizable monomers. Some examples of monomers are ethylene oxide, propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide.

Another IDP polymer is a salt modified inherently dissipative polymer derived from a polyether intermediate and can be a thermoplastic polyurethane, a polyether amide block copolymer, a polyether-ester block copolymer, and the like. More specifically, a salt-modified electrostatic dissipated polymer is made from a low molecular weight polyether oligomers. Such compounds are set forth in U.S. Pat. No. 6,140,405 and the same is hereby fully incorporated by reference. Polymers made according to this patent are commercially available as Stat-Rite® C-2400 from Noveon, Inc. of Cleveland, Ohio.

More specifically, the salt-modified electrostatic dissipating polymers are made from low molecular weight polyether oligomers, wherein the polymers display relatively low surface and volume resistivities, yet generally are free of excessive levels of extractable anions. This low molecular weight polyether oligomer that is useful is described and prepared as follows.

The low molecular weight polyether oligomer can comprise a homopolymer of ethylene oxide having a number average molecular weight of from about 200 to about 5000. The low molecular weight polyether oligomer can also comprise a copolymer of two or more copolymerizable monomers wherein one of the monomers is ethylene oxide and has a number average molecular weight from about 200 to about 20,000.

Exemplary of the comonomers which can be copolymerized with ethylene oxide are: 1,2-epoxypropane(propylene oxide); 1,2-epoxybutane; 2,3-epoxybutane(cis & trans); 1,2-epoxypentane; 2,3-epoxypentane(cis & trans); 1,2-epoxyhexane; 2,3-epoxyhexane(cis & trans); 3,4-epoxyhexane(cis & trans); 1,2-epoxy heptane; 1,2-epoxydecane; 1,2-epoxydodecane; 1,2-epoxyoctadecane; 7-ethyl-2-methyl-1,2-epoxyundecane; 2,6,8-trimethyl-1,2-epoxynonane; styrene oxide.

Other comonomers which can be used as comonomers with the ethylene oxide are: cyclohexene oxide; 6-oxabicyclo[3,1,0]-hexane; 7-oxabicyclo[4,1,0]heptane; 3-chloro-1,2-epoxybutane; 3-chloro-2,3-epxybutane; 3,3-dichloro-1,2-epoxypropane; 3,3,3-trichloro-1,2-epoxypropane; 3-bromo-1-2-epoxybutane, 3-fluoro-1,2-epoxybutane; 3-iodo-1,2-epoxybutane; 1,1-dichloro-1-fluoro-2,3-epoxypropane; 1-chloro-1,1-dichloro-2,3-epoxypropane; and 1,1,1,2-pentachloro-3,4-epoxybutane.

Typical comonomers with at least one ether linkage useful as comomoners are exemplified by: ethyl glycidyl ether; n-butyl glycidyl ether; isobutyl glycidyl ether; t-butyl glycidyl ether; n-hexyl glycidyl ether; 2-ethylhexyl glycidyl ether; heptafluoroisopropyl glycidyl ether, phenyl glycidyl ether; 4-methyl phenyl glycidyl ether; benzyl glycidyl ether; 2-phenylethyl glycidyl ether; 1,2-dihydropentafluoroisopropyl glycidyl ether; 1,2-trihydrotetrafluoroisopropyl glycidyl ether; 1,1-dihydrotetrafluoropropyl glycidyl ether; 1,1-dihydranonafluoropentyl glycidyl ether; 1,1-dihydropentadecafluorooctyl glycidyl ether; 1,1-dihydropentadecafluorooctyl-.alpha.-methyl glycidyl ether; 1,1-dihydropentadecafluorooetyl-.beta.-methyl glycidyl ether; 1,1-dihydropentadecafluorooctyl-.alpha.-ethyl glycidyl ether; 2,2,2-trifluoro ethyl glycidyl ether.

Other comonomers with at least one ester linkage which are useful as comonomers to copolymerize with ethylene oxide are: glycidyl acetate; glycidyl chloroacetate; glycidyl butyrate; and glycidyl stearate; to name a few.

Typical unsaturated comonomers which can be polymerized with ethylene oxide are: allyl glycidyl ether; 4-vinylcyclohexyl glycidyl ether; .alpha.-terpinyl glycidyl ether; cyclohexenylmethyl glycidyl ether; p-vinylbenzyl glycidyl ether; allyphenyl glycidyl ether; vinyl glycidyl ether; 3,4-epoxy-1-pentene; 4,5-epoxy-2-pentene; 1,2-epoxy-5,9-cyclododeca diene; 3,4-epoxy-1-vinylchlohexene; 1,2-epoxy-5-cyclooctene; glycidyl acrylate; glycidyl methacrylate; glycidyl crotonate; glycidyl 4-hexenoate.

Other cyclic monomers suitable to copolymerize with ethylene oxide are cyclic ethers with four or more member-ring containing up to 25 carbon atoms except tetrahydropyran and its derivatives. Exemplary cyclic ethers with four or more member-ring are oxetane (1,3-epoxide), tetrahydrofuran (1,5-epoxide), and oxepane (1,6-epoxide) and their derivatives.

Other suitable cyclic monomers are cyclic acetals containing up to 25 carbon atoms. Exemplary cyclic acetals are trioxane, dioxolane, 1,3,6,9-tetraoxacycloundecane, trioxepane, troxocane, dioxepane and their derivatives.

Other suitable cyclic monomers are cyclic esters containing up to 25 carbon atoms. Exemplary cyclic esters are beta-valerolactone, epsilon-caprolactone, zeta-enantholactone, eta-caprylactone, butyrolactone and their derivatives. The low molecular weight polyether oligomer prepared by the method detailed immediately above then can be reacted with a variety of chain extenders and modified with a selected salt to form the electrostatic dissipative polymer additive or antistatic agent.

For example, the polyether oligomer described immediately above can be reacted to form an electrostatic dissipative agent comprising a copolyether-ester polymer comprising one or more polyester blocks as well as one or more low molecular weight polyether oligomer blocks. The polyester block is generally made from an aromatic containing dicarboxylic acid or diester such as terephthalic acid, dimethyl terephthalate, and the like, with a diol generally containing from about 2 to about 10 carbon atoms. The low molecular weight polyether oligomer is generally made as described above. The polyether-ester block copolymers can be represented by the following formula:

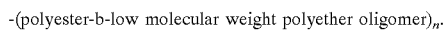

-(polyester-b-low molecular weight polyether oligomer)$_n$-.

The polyester-ether block copolymer comprises the reaction product of ethylene glycol, terephthalic acid or dimethyl terephthalate and polyethylene glycol. These and other examples of other polyester-ether copolymers which can be utilized are set forth in the Encyclopedia of Polymer Science and Engineering, Vol. 12, John Wiley & Sons, Inc., NY, N.Y., 1988, pages 49–52, which is hereby fully incorporated by reference as well as U.S. Pat. Nos. 2,623,031; 3,651,014; 3,763,109; and 3,896,078.

Alternatively, the low molecular weight polyether oligomer can be reacted to form an electrostatic dissipative agent comprising one or more polyamide blocks as well as one or more low molecular weight polyether oligomer blocks. Alternatively, the low molecular weight polyether oligomer may be reacted with the polyamide in the presence of a diacid to form a polyether ester amide having the recurring formula:

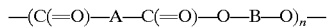

—(C(=O)—A—C(=O)—O—B—O)$_n$— where A is the polyamide and B is the low molecular weight polyether oligomer. Further information on this polymer can be found in U.S. Pat. No. 4,332,920, incorporated herein by reference.

The low molecular weight polyether oligomer can be reacted to form a polyurethane electrostatic dissipative agent, such as the Stat-Rite® C-2300 ESD agent available from Noveon, Inc. More specifically, the polyurethane electrostatic dissipative additive comprises the reaction of a hydroxyl terminated ethylene ether oligomer intermediate with a non-hindered diisocyanate and an extender glycol, where the oligomer can be a diethylene glycol-aliphatic polyester, or a polyethylene glycol.

Referring first to the polyester intermediate, a hydroxyl terminated, saturated polyester polymer is synthesized by reacting excess equivalents of diethylene glycol with considerably lesser equivalents of an aliphatic, preferably an alkyl, dicarboxylic acid having four to ten carbon atoms where the most preferred is adipic acid. Other useful dicarboxylic acids include succinic, glutaric, pimelic, suberic, azelaic and sebacic acids. The most preferred polyester intermediate is polydiethylene glycol adipate. In accordance with this aspect of the present invention, excess moles of diethylene glycol are reacted with lesser moles of dicarboxylic acid at levels from about 5 mole percent to about 50 mole percent excess of glycol to provide a hydroxyl terminated polyester oligomer chain having an average molecular weight between about 500 to 5000 and preferably between about 700 and 2500. The short chain polyester oligomer contains repeating diethylene ether structures and comprises on an equivalent basis from about 1.05 to 1.5 equivalents of diethylene glycol co-reacted with one equivalent of dicarboxylic acid to produce the low molecular weight polyester oligomer intermediate. The high excess equivalents of diethylene glycol controls the molecular weight of the polyester oligomer preferably below 2500 and further assures a hydroxyl terminated linear polyester oligomer. The polyester oligomers synthesized by reacting the diethylene glycol with lesser equivalents of dicarboxylic acid at temperatures of from about 300° F. to 450° F. in the absence or in the presence of an esterification catalyst such as stannous chloride for time sufficient to reduce the Acid No. to about zero.

The hydroxyl terminated polyester oligomer intermediate is further reacted with considerably excess equivalents of non-hindered diisocyanate along with extender glycol in a so-called one-shot or simultaneous coreaction of oligomer, diisocyanate, and extender glycol to produce the very high molecular weight linear polyurethane having an average molecular weight broadly from about 60,000 to about 500,000, preferably from about 80,000 to about 180,000, and most preferably from about 100,000 to about 180,000.

Alternatively, an ethylene ether oligomer glycol intermediate comprising a polyethylene glycol can be co-reacted with non-hindered diisocyanate and extender glycol to produce the high molecular weight, polyurethane polymer. Useful polyethylene glycols are linear polymers of the general formula H—(OCH$_2$CH$_2$)—$_n$OH where n is the number of repeating ethylene ether units and n is at least 11 and between 11 and about 115. On a molecular weight basis, the useful range of polyethylene glycols have an average molecular weight from about 500 to about 5000 and preferably from about 700 to about 2500. Commercially available polyethylene glycols are typically designated as polyethylene glycol 600, polyethylene glycol 1500, and polyethylene glycol 4000.

High molecular weight thermoplastic polyurethanes are produced by reacting together preferably in a one-shot process the ethylene ether oligomer glycol intermediate, an aromatic or aliphatic non-hindered diisocyanate, and an extender glycol. On a mole basis, the amount of extender glycol for each mole of oligomer glycol intermediate is from about 0.1 to about 3.0 moles, desirably from about 0.2 to about 2.1 moles, and preferably from about 0.5 to about 1.5 moles. On a mole basis, the high molecular weight polyurethane polymer comprises from about 0.97 to about 1.02 moles, and preferably about 1.0 moles of non-hindered diisocyanate for every 1.0 total moles of both the extender glycol and the oligomer glycol (i.e. extender glycol+ oligomer glycol-1.0).

Useful non-hindered diisocyanates comprise aromatic non-hindered diisocyanates and include, for example, 1,4-diisocyanatobenzene (PPDI), 4,4'-methylene-bis(phenyl isocyanate) MDI), 1,5-naphthalene diisocyanate (NDI), m-xylene diisocyanate (XDI), as well as non-hindered, cyclic aliphatic diisocyanates such as 1,4-cyclohexyl diisocyanate (CHDI), and H$_{12}$ MDI. The most preferred diisocyanate is MDI. Suitable extender glycols (i.e. chain extenders) are aliphatic short chain glycols having two to six carbon atoms and containing only primary alcohol groups. Preferred glycols include diethylene glycol, 1,3-propane diol, 1,4-butane diol, 1,5-pentane diol, 1,4-cyclohexane-dimethanol, hydroquinone di(hydroxyethyl)ether, and 1,6-hexane diol with the most preferred glycol being 1,4-butane diol.

The hydroxyl terminated ethylene ether oligomer intermediate, the non-hindered diisocyanate, and the aliphatic extender glycol are co-reacted simultaneously in a one-shot polymerization process at a temperature above about 100° C. and usually about 120° C., whereupon the reaction is exothermic and the reaction temperature is increased to about 200° C. to above 250° C.

An effective amount of a salt, salt complex or salt compound formed by the union of a metal ion with a non-metallic ion or molecule is added during the one-shot polymerization process. While the exact mechanism of attachment and/or attraction of the salt to the ESD polymer reaction product is not completely understood, the salt unexpectedly improves the surface and volume resistivities of the resulting polymer without the presence of unacceptably high levels of extractable anions. Moreover, the static decay times remain in an acceptable range, that is, the times are not too fast or too slow. Examples of salts useful in the subject invention include: $LiClO_4$, $LiN(CF_3SO_2)_2$, $LiPF_6$, $LiAsF_6$, $LiI$, $LiBr$, $LiSCN$, $LiSO_3$ $CF_3$, $LiNO_3$, $LiC(SO_2 CF_3)_3$, $Li_2 S$, and $LiMR_4$ where M is Al or B, and R is a halogen, alkyl or aryl group. The preferred salt is Li $N(CF_3SO_2)_2$, which is commonly referred to as lithium trifluoromethane sulfonimide. The effective amount of the selected salt added to the one-shot polymerization is at least about 0.10 parts based on 100 parts of the polymer, desirably at least about 0.25 parts and preferably at least about 0.75 parts.

It has been discovered that the amount of salt utilized can be unexpectedly lowered when the salt is added in conjunction with an effective amount of a co-solvent. Examples of co-solvents suitable for this purpose include ethylene carbonate, propylene carbonate, dimethyl sulfoxide, tetramethylene sulfone, tri- and tetra ethylene glycol dimethyl ether, gamma butyrolactone, and N-methyl-2-pyrrolidone. Ethylene carbonate is preferred. Although the addition of one of the co-solvents is optional, in some applications lower amounts of the salt may be desirable. The effective amount of co-solvent required to achieve the desired result of lower salt usage while still attaining the desired properties in the ESD polymer, is at least about 0.10 parts based on 100 parts of the polymer, preferably at least about 0.50 parts, and most preferably at least about 1.0 parts. Thus, it is unexpectedly found that addition of the co-solvent together with a lowered amount of the salt synergistically lowers the surface and volume resistivities of the ESD polymer, without adversely affecting the presence of only relatively low amounts of extractable anions, in a manner similar to that which is observed when slightly higher amounts of the salt alone are added to the polymerization.

Other suitable static dissipative agents include, but are not limited to, antistats and the like. Examples of antistatic agents include quaternary ammonium salts, ethoxylated quaternary ammonium salts, propoxylated and ethoxylated fatty amines and/or amides, amine salts, polyamines, glycerol stearates, alkyl sulphonates, alkylbenzene sulfonates, and phosphonium salts.

In order to render the overlayer compatible with the core layer, preferably the host polymer used in the overlayer is the same as the host polymer used in the core layer. For example, if HIPS is utilized as a core polymer, the host polymer is the same. Accordingly, if an amorphous polyester is utilized in the core layer, the host polymer is also an amorphous polyester, and so forth.

The amount of the host polymer present in the overlayer is generally in a range from about 50% to about 90% by weight, and preferably from about 70% to about 85% by weight based upon the total weight of polymer in the overylayer, i.e. one or more host polymers and one or more dissipating polymers. The difference, that is from about 10% to about 50% by weight and preferably from about 15% to about 30% by weight, naturally, is the dissipating polymer.

In order to assure good adherence of the overlayer to the core polymer layer as when these layers are incompatible, a tie layer comprising adhesion promoting additives optionally can be utilized between the overlayer(s) and the core layer. Suitable tie layers include block copolymers of styrene-butadiene-styrene such as Kraton® FG 1901X made by Shell Chemical Company. Other adhesion promoting agents include EVA and Acrylic Copolymers. The tie layer thickness is generally very thin such as from about 1 to about 3 mils.

Alternatively, adhesion promoting additives can be utilized directly in the overlayer or core layer. The amount of such adhesive promoting agents generally ranges from about 0.1 to about 20 parts and desirably from about 1 to about 5 parts by weight for every 100 parts by weight of polymer in the overlayer or core layer.

The surface resistivity of the overlayer is generally from about $1.0 \times 10^5$ to about $1.0 \times 10^{12}$, and preferably from about $1.0 \times 10^7$ to about $1.0 \times 10^{10}$ OHM/Sq., and the volume resistivity is generally from about $1.0 \times 10^5$ to about $1.0 \times 10^{12}$ and preferably from about $1.0 \times 10^7$ to about $1.0 \times 10^{10}$ Ohm-cm.

The overlayer can be applied to the core layer in any conventional manner such as by extrusion followed by lamination, co-extrusion and the like. Preferably, by co-extrusion of multi-layers using two or more extruders in tandum to produce an AB laminate, an ABA laminate or an ABC laminate or an ACBCA laminate etc., wherein A is an overlayer, B is a core layer, and C is a tie layer. Co-extrusion of the multi-layer is commonly known technology utilizing two or more extruders connected by a specific distribution-block structure to a multi-manifold extrusion die head to produce the above noted laminates.

The end result is a laminate or a multi-layer sheet article containing the above-described core layer and preferably an overlayer on each side of the core layer. The surface resisitivity of the multi-layer article or laminate is generally from about $1.0 \times 10^5$ to about $1.0 \times 10^{12}$ and preferably from about $1.0 \times 10^7$ to about $1.0 \times 10^{10}$ OHM/Sq., and the volume resistivity of a multi-layer article or laminate is generally from about $1.0 \times 10^5$ to about $1.0 \times 10^{12}$ and preferably from about $1.0 \times 10^7$ to about $1.0 \times 10^{10}$ Ohm-cm. With these laminates, static decay is desirably within 1 second and preferably 0.1 second or less.

Tribocharge is desirably less than 20V and preferably less than 10V.

Inasmuch as the overlayer has no carbon black therein, the laminate of the present invention is essentially free of particulation so that carbon black particles emitted are negligible. That is, the amount of particulation is generally far less than 15,000, 10,000, or 5,000 counts and desirably less than 1500 counts by LPC (Liquid-borne Particle Counter).

The carbon black free overlayer also results in a laminate generally free of sloughing. This term defines the propensity of a polymer blend filled with carbon black to impart dark prints on contact surfaces such as work benches, etc. Moreover, overlayers free of carbon black do not contaminate packaged components or interfere with subsequent soldering operations. Accordingly, laminates of the present invention generally have a sloughing rate of 2 or less, desirably 1 or less, and preferably 0, when rated on the scale of 0(No sloughing/No Mark at all) to 5(dark like a pencil mark).

The electrical advantages of the current invention are 1) a static dissipative surface providing a controlled release of electrical potential from a charged object that comes into contact with it, 2) a surface free from "hot spots" due to the uniform morphology of the inherently dissipative polymer alloy used as the overlayer, 3) a conductive core that enhances charge decay compared to an inherently dissipative polymer alloy monolayer.

Advantage one is important because a conductive surface, such as that of a carbon black filled HIPS, will rapidly release electrical potential from charged objects that it comes into contact with. Sensitive electronic devices that have become charged can be damaged if they rapidly release potential to a ground. The invention has a static dissipative surface that will release potential at a rate that does not damage devices.

Advantage two is important because materials filled to practical levels with conductive particulates such as carbon black often have microscopic domains that are electrically insulative. This is particularly true after secondary processing such as thermoforming. These domains, often referred to as "hot spots," can trap or retain charge. This retained charge can damage ESD sensitive devices that come into contact or proximity to the surface. The invention provides a surface that is free from "hot spots."

Advantage three is important because it provides enhanced protection to sensitive devices. Path of lowest resistance will be away from the surface and packaged components since the conductive core has lower resistance than the static dissipative surface. Inherently dissipative polymer alloy monolayers do not offer this advantage.

The electrostatic dissipating polymeric laminates of the present invention are thus ideally suited for various packaging applications such as shipping and handling trays for the electronic field, for example chips, GMR heads, printed circuit boards, and the like in order to reduce the susceptibility of static charge buildup.

The laminates of the present invention provide rapid but controlled decay of electrical potential. As stated hereinabove, the core layer of the present invention preferably is more conductive or dissipative than the overlayer and tie layer. Accordingly, preference for charge transfer is in the more conductive core layer rather than the surface layers and thus away from the packaged material such as a sensitive electrical component thus protecting the same.

Depending upon the particular end use, the layer thickness of the laminate can vary considerably. The thickness of the core layer can generally range from about 5 to about 200 mils, and desirably from about 10 to about 80 mils. The thickness of each overlayer is from about 0.1 to about 20 mils and desirably from about 1 to about 3 mils.

Advantageously, the laminate sheets of the present invention can be thermoformed as known in the art into a desired shape, wherein the laminate is heated to a molten state and formed via vacuum or pressure against a mold.

The foregoing invention will be better understood by reference of the following examples which serve to illustrate, but not to limit the present invention.

EXAMPLES

The multi-layer laminate of the examples were prepared as follows. The main extruder and one satellite extruder are connected to a multi-manifold sheet die by a distribution block. The distribution block feeds material B from the main extruder into the center manifold of the die. The distribution block splits the flow of material A from the satellite extruder into two separate streams. One stream is fed to the top manifold of the die. One stream is fed to the bottom manifold of the die. The manifolds spread each stream into a web or sheet layer. The webs are combined just before the exit of the die to form an ABA tri-layer.

Example 1

Material A is a melt blend of inherently dissipative polymer with an ABS copolymer. The blend composition by weight is 80% ABS and 20% Stat-Rite C-2400 polyurethane based inherently dissipative polymer.

Material B is a conductive carbon black filled polycarbonate available from DSM of the Netherlands. Materials A and B were each extruded into 30 mil monolayer sheets. Various properties of the extruded sheets were tested and are listed in Table 1.

To make the multi-layer laminate, materials A and B were coextruded into a 30 mil ABA sheet comprising 10/80/10 layer ratios wherein two overlayers of material A surround a core layer of material B. The various properties of the multi-layer laminate are also shown in Table 1.

The multi-layer laminate (ABA) has surface resistivity in the preferred range, exhibiting a static dissipative surface as opposed to the non-preferred, conductive surface exhibited by material B. The multi-layer shows an order of magnitude lower resistivity and static decay compared to the monolayer of material A. The multi-layer does not exhibit any sloughing.

TABLE 1

| Properties | Material A ABS/IDP | Material B PC/CB | Multi-layer (ABA) |
|---|---|---|---|
| Surface resistivity, ohm/sq.[1] | 1E10 | <E6 | 1E9 |
| Volume resistivity, ohm-cm[2] | 1E11 | <E6 | 1E10 |
| Static decay, sec.[3] | 0.5 | <0.1 | 0.35 |
| Tribocharge (range) average, volts[4] | (2–4)4 | (1–2)2 | (3–7)6 |
| Sloughing, 0 to 5 ranking[5] | 0 | 4 | 0 |
| Thickness, mils | 30 | 30 | 30 |

Example 2

Material A is a melt blend of inherently dissipative polymer with a high impact polystyrene. The blend composition by weight is 75% HIPS and 25% Stat-Rite C-2400 polyurethane based inherently dissipative polymer.

Material B is a sixteen weight percent conductive carbon black filled HIPS available from Noveon Inc. of Cleveland, Ohio. Materials A and B were each extruded into 30 mil monolayer sheets. Various properties of the extruded sheets were tested and are listed in Table 2.

To make the multi-layer laminate, materials A and B were coextruded into a 30 mil ABA sheet comprising 10/80/10 layer ratios wherein two overlayers of material A surround a core layer of material B. The various properties of the multi-layer laminate are also shown in Table 2.

The multi-layer laminate (ABA) has surface resistivity in the preferred range, exhibiting a static dissipative surface as opposed to the non-preferred, conductive surface exhibited by material B. The multi-layer shows greater than an order of magnitude lower resistivity, shorter static decay time, and lower tribocharging voltage compared to the monolayer of material A. The multi-layer does not exhibit any sloughing.

TABLE 2

| Properties | Material A HIPS/IDP | Material B HIPS/CB | Multi-layer (ABA) |
|---|---|---|---|
| Surface resistivity, ohm/sq.[1] | 1E10 | <E6 | 4E8 |
| Volume resistivity, ohm-cm[2] | 1E11 | <E6 | 2E9 |
| Static decay, sec.[3] | 0.6 | <0.1 | 0.1 |
| Tribocharge (range) average, volts[4] | (44–75)61 | (2–3)3 | (6–11)8 |

TABLE 2-continued

| Properties | Material A HIPS/IDP | Material B HIPS/CB | Multi-layer (ABA) |
|---|---|---|---|
| Sloughing, 0 to 5 ranking[5] | 0 | 5 | 0 |
| Thickness, mils | 30 | 30 | 30 |

Example 3

Material A is a melt blend of inherently dissipative polymer with PETG. This material is Stat-Rite S680 and is commercially available from Noveon Inc. of Cleveland, Ohio.

Material B is a carbon black filled PETG, Eastastat GSP32. It is commercially available from Eastman Chemical of Kingsport, Tenn. Materials A and B were each extruded into 24 mil monolayer sheets. Various properties of the extruded sheets were tested and are listed in Table 3.

To make the multi-layer laminate, materials A and B were coextruded into a 30 mil ABA sheet comprising 10/80/10 layer ratios wherein two overlayers of material A surround a core layer of material B. The various properties of the multi-layer laminate are also shown in Table 3.

The multi-layer laminate (ABA) has surface resistivity in the preferred range, exhibiting a static dissipative surface as opposed to the non-preferred, conductive surface exhibited by material B. The multi-layer shows lower resistivity compared to the monolayer of material A. The multi-layer does not exhibit any sloughing.

TABLE 3

A = PETG/IDP
B = CB FILLED PETG

| Properties | Material A PETG/IDP | Material B PETG/CB | Multi-layer (ABA) 10/80/10 |
|---|---|---|---|
| Surface resistivity, ohm/sq.[1] | 3E8 | <E6 | 9E7 |
| Volume resistivity, ohm-cm[2] | 2E9 | <E6 | 8E8 |
| Static decay, sec.[3] | 0.1 | 0.1 | 0.1 |
| Sample thickness (mil) | 24 | 24 | 30 |
| Sloughing, 0 to 5 ranking[5] | 0 | 4 | 0 |

What is claimed is:

1. A multi-layer electrostatic dissipative article comprising:
   at least one overlayer comprising a) an overlayer polymer and b) an electrostatic dissipating agent; and
   a core layer bonded to said overlayer, wherein said core layer comprises a) a core polymer and b) a conductive component; and wherein said core layer has a surface resistivity less than the overlayer when measured independently.

2. A multi-layer article according to claim 1, wherein two overlayers exist, one on each side of said core layer.

3. A multi-layer article according to claim 1, wherein said overlayer has a surface resistivity of from about $1.0 \times 10^5$ to about $1.0 \times 10^{12}$ Ohm/sq, and wherein said core layer has a surface resistivity of from about $1.0 \times 10^1$ to about $1.0 \times 10^{11}$ Ohm/sq.

4. A multi-layer article according to claim 2, wherein each said overlayer is substantially free of carbon black.

5. A multi-layer article according to claim 4, wherein said core polymer and said overlayer polymer, independently, comprises an amorphous polyester, a polyamide, a styrene-acrylonitrile copolymer, a polyacetal, a polysulfone, a polybutylene terephthalate, a polyphenylene sulfide, a polyethersulfone, a polyphenylene ether, a polymethacrylate, a polyetheretherketone, a polypropylene, a polycarbonate, a polystyrene, a polyacrylate, a high impact polystyrene, an acrylonitrile-butadiene-styrene, a polyethylene, a polyethylene terephthalate, a polyurethane, a polyethylene terephthalate glycol, polyvinyl chloride, or a combination thereof.

6. A multi-layer article according to claim 5, wherein said article comprises a tie-layer between said core layer and said overlayer.

7. A multi-layer article according to claim 3, wherein said overlayer has a volume resistivity of from about $1.0 \times 10^5$ to about $1.0 \times 10^{12}$ Ohm-cm, and wherein said core layer has a volume resistivity of from about $1.0 \times 10^1$ to about $1.0 \times 10^{11}$ Ohm-cm.

8. A multi-layer article according to claim 5, wherein said overlayer has a surface resistivity of from about $1.0 \times 10^7$ to about $1.0 \times 10^{10}$ Ohm/sq, and wherein said core layer has a surface resistivity of from about $1.0 \times 10^2$ to about $1.0 \times 10^6$ Ohm/sq.

9. A multi-layer article according to claim 8, wherein said overlayer has a volume resistivity of from about $1.0 \times 10^7$ to about $1.0 \times 10^{10}$ Ohm-cm, and wherein said core layer has a volume resistivity of from about $1.0 \times 10^2$ to about $1.0 \times 10^6$ Ohm-cm.

10. A multi-layer article according to claim 3, wherein said conductive component is carbon black, carbon fibers, carbon fibrils, metal shavings or powders, metal fillers, a conductive polymer, or a combination thereof.

11. A multi-layer article according to claim 8, wherein said conductive component comprises carbon black in an amount from about 2 to about 30 parts by weight per 100 parts by weight of the core polymer.

12. A multi-layer article according to claim 10, wherein said conductive component comprises a conductive polymer and wherein said conductive polymer is polyaniline (PAni), a polypyrrole (Ppy), a polythiophene (PTh), a polyacetylene (PAc), a polyisothianaphthane (PITN), a polyheteroarylene vinylene (ParV) in which the heteroarylene group can be thiophene, furan or pyrrole, a poly-p-phenylene (PpP), a polyphenylene sulfide (PPS), a polyphthalocyanine (PPhC), or a copolymer, or a derivative, or a combination thereof.

13. A multi-layer article according to claim 3, wherein said electrostatic dissipating agent is an inherently dissipative polymer or an antistat, or a combination thereof.

14. A multi-layer article according to claim 13, wherein said inherently dissipative polymer exists and is a polyethylene glycol-based polyurethane copolymer, a polyethylene glycol-based polyamide copolymer, polyethylene glycol methacrylate copolymer, poly(ethylene/propylene oxide) copolymer, polyethylene glycol based polyesteramide, polyethylene glycol based polyester elastomer, poly (epichlorohydrin/ethylene oxide) copolymer or polyesteramide derived from an ethylene oxide adduct of bisphenol with polyamid having a carboxyl group at both terminal ends, or a combination thereof.

15. A multi-layer article according to claim 14, wherein said core polymer comprises high impact polystyrene, polyethylene terephthalate glycol, or polyvinyl chloride.

16. A multi-layer article according to claim 3, wherein said overlayer has a thickness of from about 0.1 to about 20 mils, and wherein said core layer has a thickness of from about 5 to about 200 mils.

17. A multi-layer article according to claim 14, wherein said overlayer has a thickness of from about 1 to about 3 mils, and wherein said core layer has a thickness of from about 10 to about 80 mils.

18. A multi-layer electrostatic dissipative article comprising:
   at least one overlayer having a surface resistivity of from about $1\times10^5$ Ohm/sq to about $1\times10^{12}$ Ohm/sq, wherein said overlayer is substantially free of particulation; and
   a core layer having a surface resistivity of from about $1\times10^1$ Ohm/sq to about $1\times10^{11}$ Ohm/sq, and wherein said core layer comprises a) a core polymer and b) a conductive component.

19. A multi-layer article according to claim 18, wherein two overlayers are present, with one overlayer on each side of said core layer.

20. A multi-layer article according to claim 18, wherein said overlayers are substantially free of carbon black, and wherein each said overlayer comprises an overlayer polymer and an electrostatic dissipating agent.

21. A multi-layer article according to claim 20, wherein said core polymer comprises and said overlayer polymer, independently, comprises an amorphous polyester, a polyamide, a styrene-acrylonitrile copolymer, a polyacetal, a polysulfone, a polybutylene terephthalate, a polyphenylene sulfide, a polyethersulfone, a polyphenylene ether, a polymethacrylate, a polyetheretherketone, a polypropylene, a polycarbonate, a polystyrene, a polyacrylate, a high impact polystyrene, an acrylonitrile-butadiene-styrene, a polyethylene, a polyethylene terephthalate, a polyurethane, a polyethylene terephthalate glycol, polyvinyl chloride, or a combination thereof.

22. A multi-layer article according to claim 21, wherein said article comprises a tie-layer between said core layer and said overlayer.

23. A multi-layer article according to claim 21, wherein said overlayer has a surface resistivity of from about $1.0\times10^7$ to about $1.0\times10^{10}$ Ohm/sq, and wherein said core layer has a surface resistivity of from about $1.0\times10^2$ to about $1.0\times10^6$ Ohm/sq.

24. A multi-layer article according to claim 23, wherein said overlayer has a volume resistivity of from about $1.0\times10^7$ to about $1.0\times10^{10}$ Ohm-cm, and wherein said core layer has a volume resistivity of from about $1.0\times10^2$ to about $1.0\times10^6$ Ohm-cm.

25. A multi-layer article according to claim 24, wherein two overlayers are present, with one overlayer on each side of said core layer, and wherein said conductive component is carbon black, carbon fibers, carbon fibrils, metal shavings or powders, metal fillers, a conductive polymer, or a combination thereof.

26. A multi-layer article according to claim 25, wherein said conductive component comprises carbon black in an amount from about 2 to about 30 parts by weight per 100 parts by weight of the core polymer.

27. A multi-layer article according to claim 25, wherein said conductive component comprises a conductive polymer and wherein said conductive polymer is polyaniline (PAni), a polypyrrole (Ppy), a polythiophene (PTh), a polyacetylene (PAc), a polyisothianaphthane (PITN), a polyheteroarylene vinylene (ParV) in which the heteroarylene group can be thiophene, furan or pyrrole, a poly-p-phenylene (PpP), a polyphenylene sulfide (PPS), a polyphthalocyanine (PPhC), or a copolymer, or a derivative, or a combination thereof.

28. A multi-layer article according to claim 21, wherein said electrostatic dissipating agent is an inherently dissipative polymer or an antistat, or a combination thereof.

29. A multi-layer article according to claim 28, wherein said inherently dissipative polymer is a polyethylene glycol-based polyurethane copolymer, a polyethylene glycol-based polyamide copolymer, polyethylene glycol methacrylate copolymer, poly(ethylene/propylene oxide) copolymer, polyethylene glycol based polyesteramide, polyethylene glycol based polyester elastomer, poly(epichlorohydrin/ethylene oxide) copolymer or polyesteramide derived from an ethylene oxide adduct of bisphenol with polyamid having a carboxyl group at both terminal ends, or a combination thereof.

30. A multi-layer article according to claim 29, wherein said core polymer and said at least one overlayer comprise high impact polystyrene, polyethylene terephthalate glycol, or polyvinyl chloride, and wherein two overlayers are present, with one overlayer on each side of said core layer.

31. A multi-layer article according to claim 18, wherein said overlayer has a thickness of from about 0.1 to about 20 mils, and wherein said core layer has a thickness of from about 5 to about 200 mils.

32. A multi-layer article according to claim 30, wherein said overlayer has a thickness of from about 1 to about 3 mils, and wherein said core layer has a thickness of from about 10 to about 80 mils.

* * * * *